United States Patent

Nagai et al.

Patent Number: 5,514,208
Date of Patent: May 7, 1996

[54] AQUEOUS INK AND METHOD FOR RECORDING IMAGE WITH THE AQUEOUS INK

[75] Inventors: Kiyofumi Nagai, Machida; Akiko Konishi, Tokyo; Tetsuya Kaneko, Yokohama, all of Japan

[73] Assignee: Ricoh Company, Ltd., Tokyo, Japan

[21] Appl. No.: 360,283

[22] Filed: Dec. 21, 1994

[30] Foreign Application Priority Data

Dec. 22, 1993 [JP] Japan ................... 5-323983

[51] Int. Cl.⁶ .................................. C09D 11/02
[52] U.S. Cl. .................... 106/22 H; 106/20 D
[58] Field of Search ................. 106/22 H, 20 D

[56] References Cited

U.S. PATENT DOCUMENTS

| | | | |
|---|---|---|---|
| 3,708,499 | 2/1973 | Andree et al. | 106/22 H |
| 4,581,071 | 4/1986 | Akutsu et al. | 106/22 H |
| 5,279,656 | 1/1994 | Kenyon et al. | 106/22 H |

FOREIGN PATENT DOCUMENTS

| | | | |
|---|---|---|---|
| 2148088 | 3/1973 | France | 106/22 H |
| 2535077 | 8/1975 | Germany | 106/22 H |
| 190478 | 9/1985 | Japan | 106/22 H |
| 2134129 | 8/1984 | United Kingdom | 106/22 H |

Primary Examiner—Helene Klemanski
Attorney, Agent, or Firm—Oblon, Spivak, McClelland, Maier & Neustadt

[57] ABSTRACT

This invention provides an aqueous ink composition, in which the composition satisfies several requirements for properties of an ink for ink-jet printing, has a superior tone for magenta color and has an improved waterfastness. The aqueous ink composition comprises a dye, water and a huemectant, the dye comprising a dye of a general formula (I):

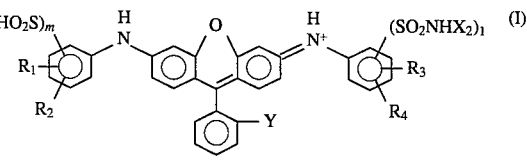

9 Claims, No Drawings

AQUEOUS INK AND METHOD FOR RECORDING IMAGE WITH THE AQUEOUS INK

BACKGROUND OF THE INVENTION (1) Field of the Invention

The present invention relates to an aqueous ink suitable for use in an ink-jet recording, in particular, an aqueous ink composition presenting a good quality as a color ink for a sheet of plain paper. This invention also relates to an aqueous ink composition which is preferably employed in an ink-jet printer, writing utensils such as ball point pens, marking pens and fountain pens, a recorder, or a pen-plotter.

(2) Description of the Prior Art

Recently, the ink-jet printer has been commonly used due to its advantages such as a low noise or a low running cost, and a color printer capable of being used for printing on the plain paper is also commercially available. However, in the conventional printers described above, all of requirements such as a regeneration of a color of an image, a waterfastness, a lightfastness, a dryness of an image and a reliable spread or discharge of the image can not be easily achieved. Particularly, in a case of the color printer, even if a degradation of the image would not occur in a printing unit for a particular color, for example, yellow, magenta or cyan, the image tends to degrade when more than two colors of red, green or blue are superimposed. In particular, when the image on the paper is dried without using a fixing unit, a permeability of the ink should be improved to aid the dryness of the image, as described in Japanese Laid-Open Patent Application No.55-29546. Without sufficient dryness, the image may too widely spread over the paper.

In Japanese Published Patent No.60-23793, it has been described that dialkyl sulfosuccinic acid may be a surfactant which can improve the dryness of the image and can cause less degradation of the image. However, dialkyl sulfosuccinic acid may cause disadvantages in that a diameter of a pixel of the image differs according to the type of paper used, a density of the image may significantly degrade, and the surfactant may be dissolved by alkali and lose its activity.

In Japanese Published Patent No.58-6752, a less-spreading and rapid-drying ink is described in which an ethylene oxide addition having an acetylenic linkage is used as a surfactant so that the permeability of the ink into the paper is improved. However, there may occur a problem in that the above-mentioned ink can not increase its rate of dryness when used with a direct dye such as DBK168 which has a hydrophobic interaction with the surfactant.

Furthermore, in Japanese Laid-Open Patent Application No.56-57862, another ink is described in which a strong basic substance is added to the ink. This addition of the strong basic substance may be effective in a case of acid paper being rosin-sized, but may not be effective in a case of the paper being sized by alkyl ketene dimer or alkenyl sulfosuccinic acid. The strong basic substance may not function well when two colors are superimposed on the acid paper.

A recording liquid is described in Japanese Laid-Open Patent Application No.1-203483, in which the recording liquid includes a polyhydric alcohol derivative and pectin. This liquid has pectin as a thickener so that an image is prevented from being spread and bled. However, there may occur a problem in that pectin is lacking a discharging stability after an interval during which printing is stopped, because pectin has a hydroxyl group acting as a hydrophilic group and is non-ionic.

On the other hand, in order to establish both the color-regeneration and the waterfastness on the plain paper, improvement of the dye per se is being attempted. However, it is not easy to achive a reliable dye whose waterfastness is also improved.

Applicants for the present application also have researched various magenta dyes and have developed a magenta ink which satisfies requirements for both the waterfastness and reliability in Japan Laid-Open Patent Application No.64-6237. However, the ink presents a tone of poor quality on the plain paper.

SUMMARY OF THE INVENTION

Accordingly, it is a general object of the present invention to provide a novel and useful aqueous ink composition which satisfies the above-mentioned requirements for an ink used with an ink-jet printer, in which the aqueous ink composition has a good tone for a magenta color and an improved waterfastness.

It is a second object of the present invention to provide embodiments of an ink composition which offers a stable preservation of a dye which has a high waterfastness and a tone of good quality.

It is a third object of the present invention to provide an embodiment of a structure of a surfactant which is added to, or preferably, used in, the ink of the present invention in order to improve a permeability of the ink and also to provide embodiments of a counter ion to improve a preservation stability of the surfactant.

It is a fourth object of the present invention to provide required physical properties of the ink to achieve a stable preservation of the ink composition.

It is a fifth object of the present invention to provide a method for recording an image of good quality with the ink according to the present invention.

With an elaborated research effort, we have found that a particular dye has been effective to overcome the above-mentioned problems, and thus have achieved the present invention.

That is to say, the present invention relates to a magenta ink for an ink-jet recording, in particular, the magenta ink whose tone and waterfastness are suitable for use in a color-printing on plain paper. The present invention also relates to a magenta aqueous ink which has a high-dryness feature and less degradation of an image quality. According to the present invention, it is found that a dye of the following general formula (I) permits a high chroma and a highly waterfast image to be achieved when the colored image is printed on the plain paper:

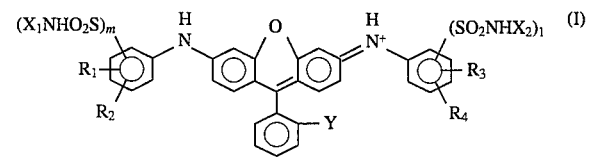

wherein $R_1$, $R_2$, $R_3$ and $R_4$ are selected from a hydrogen atom, an alkyl group having from 1 to 4 carbon atoms and a halogen atom; $X_1$ and $X_2$ are selected from a group of a general formula (II a) or (II b):

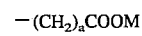 (IIa)

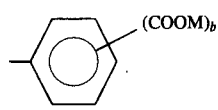

where M is selected from an alkali metals, a quaternary ammonium and a quaternary phosphonium or an alkanol amine having from 1 to 4 carbon atoms, a is an integer varying from 0 to 6, b is an integer varying from 1 to 2; l and m are selected from 0 and 1 while l and m are not simultaneously equal to 1; and Y is selected from —$SO_3^-$ and —$COO^-$.

According to the present invention, it has been found that an application of polyoxyethylenealkyl etheracetic acid salt (IV) and/or dialkyl sulfosuccinic acid salt (V) including a branching alkyl chain having from 5 to 7 carbon atoms in order to improve a permeability of the ink into the paper causes a surface tension of the ink to be reduced to be equal to or lower than 50 mN/m, and thus a wetting of the ink on a surface of the paper is improved and the rate of the permeability of the ink into the paper is increased. Furthermore, use of a colorant of the above-mentioned general formula (I) allows the degradation of the image quality to be fairly low. This results in that a spreading and bleeding of the ink may be reduced since the dye or ink has been thickened by protons supplied from the surface of the paper.

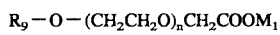

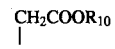

wherein $R_9$ is selected from a straight chain and branching alkyl group having from 6 to 14 carbon atoms, $R_{10}$ and $R_{11}$ are selected from a branching alkyl group having from 5 to 7 carbon atoms, $M_1$ and $M_2$ are selected from an alkali metals, quaternary ammonium, quaternary phosphonium and alkanol amine having from 1 to 4 carbon atoms, and n is an integer varying from 3 to 12.

According to the present invention, a cation selected from Na, Li and compounds of a general formula (III) is used as a counter ion of the dye and the surfactant:

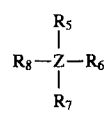

wherein Z is selected from a nitrogen atom and a phosphorous atom, $R_5$, $R_6$, $R_7$ and $R_8$ are selected from a hydrogen atom, an alkyl group having from 1 to 4 carbon atoms, a hydroxy alkyl group having from 1 to 4 carbon atoms and a halide alkyl group having from 1 to 4 carbon atoms. The above-mentioned cation has been found to cause a high stable solubility of the ink.

A stable preservation of the ink is achieved if a pH of the ink is adjusted to be equal to or more than 6 and most of copying papers or sheets have a pH varying from 5 to 6. A method for recording a high-quality and high-resolution image according to the present invention is described hereinafter. An outlet amount of 30–160 ng by weight is ejected from an outlet which has a small size of 30–60 μm in a form of a small droplet of the ink, and then recorded on so-called plain paper having a Stockigt sizing degree of equal to or more than 3 seconds. Thus, the high-quality and high-resolution image is formed on the plain paper. However, if the pH is equal to or more than 9, the surfactant including the compound of the general formula (III) tends to alter its physical property during the preservation, therefore, preferably, the pH will be adjusted to be from 6 to 9 if the compound of the general formula (V) is used as the surfactant.

If the compound of the general formula (IV) and/or (V) is added from 0.05% to 10% by weight to the ink, a required property by the printer, for example, the permeability can be provided for the ink. Less than 0.05% addition of the compound of the general formula (IV) and the general formula (V) causes the ink to spread over a portion on which two colors are superimposed. More than 10% addition of the above-mentioned compound causes the compound itself to be easily precipitated at a lower temperature and also causes the dye to be precipitated, so that a reliability of the ink may be reduced.

According to the present invention, it has been found that an application of acetylene glycol of the following general formula (VI) or acetylene alcohol of the following general formulas (VII) and (VIII) results in the high permeability of the ink, the low degradation of the image quality, less bubbling and high jet stability:

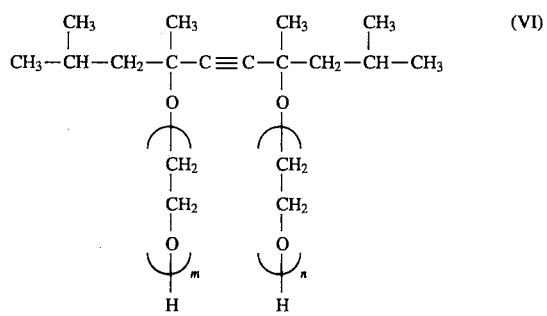

where m and n represent integers satisfying 3<m+n<40)

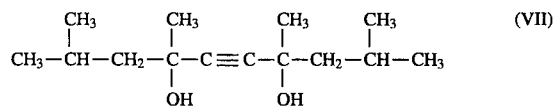

and

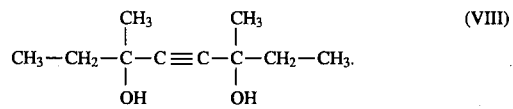

An embodiment of the effective surfactant is selected from nonionic surfactants such as secondary alkyl polyoxyalkylene ether, nonylphenyl polyoxyalkyl ether and polyoxyethylene-polyoxypropylene copolymer.

DESCRIPTION OF THE PREFERRED EMBODIMENTS

A description will now be given of particular embodiments of the dye of the general formula (I) according to the present invention in a form of free acids.

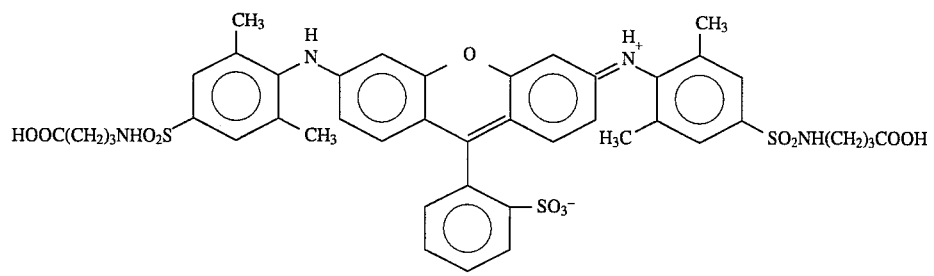 (I-1)
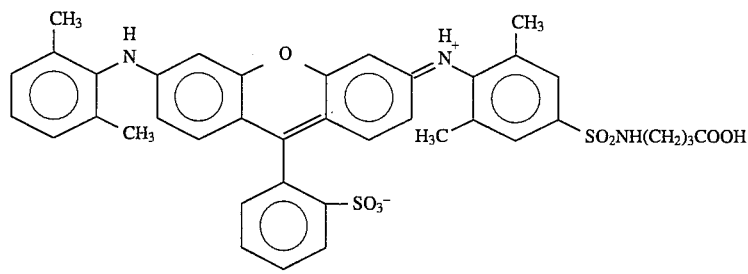 (I-2)
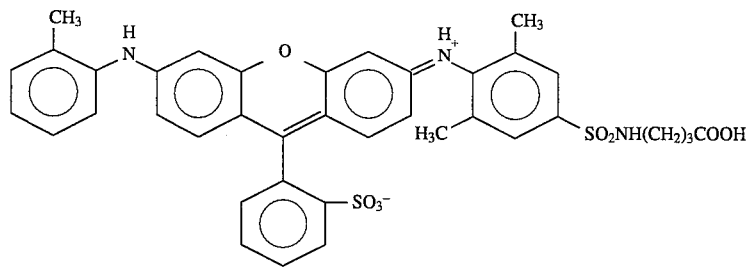 (I-3)
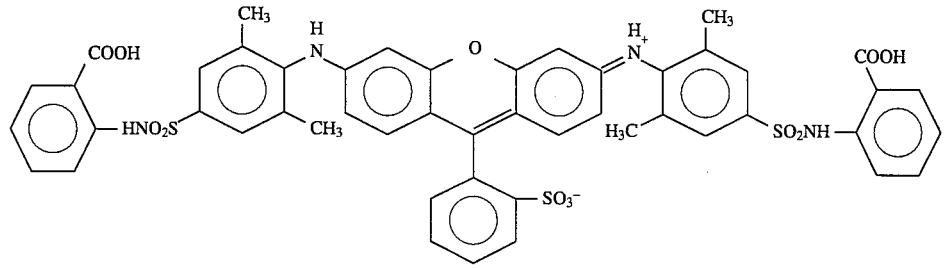 (I-4)
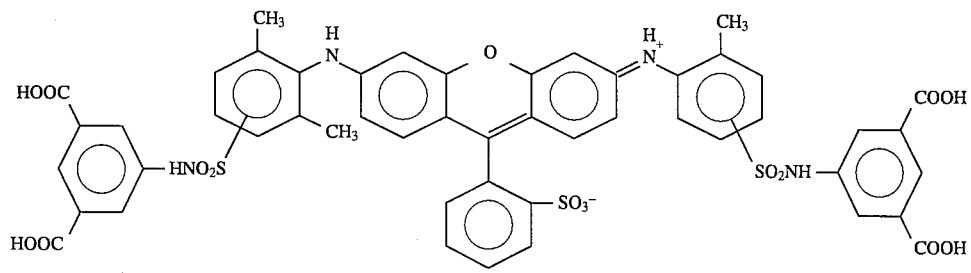 (I-5)
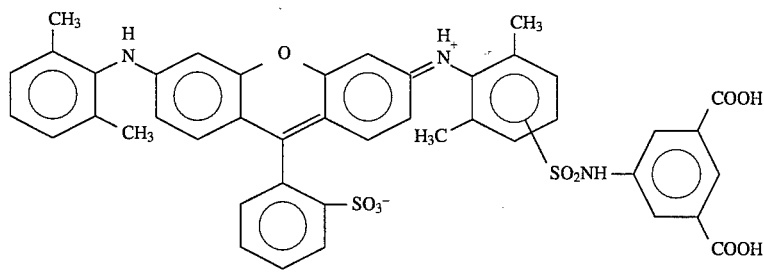 (I-6)

-continued
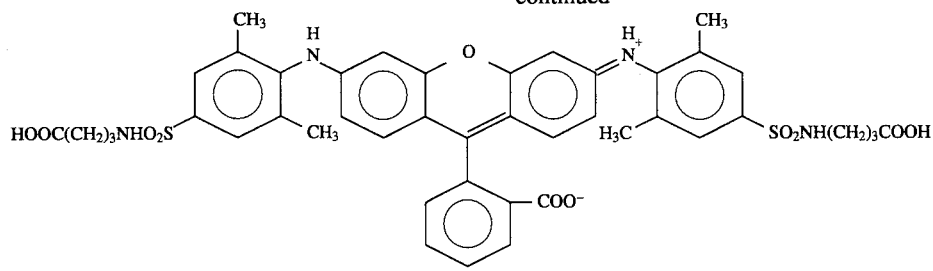 (I-7)
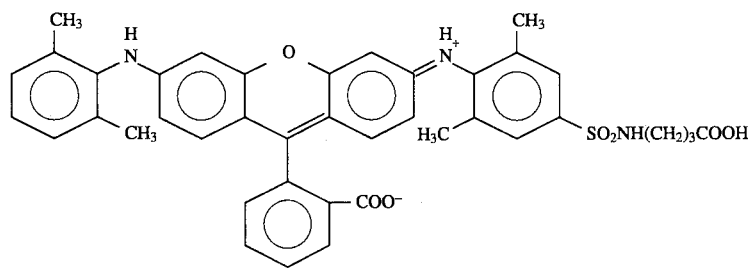 (I-8)
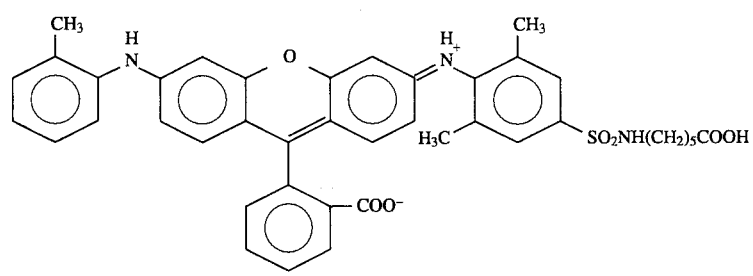 (I-9)
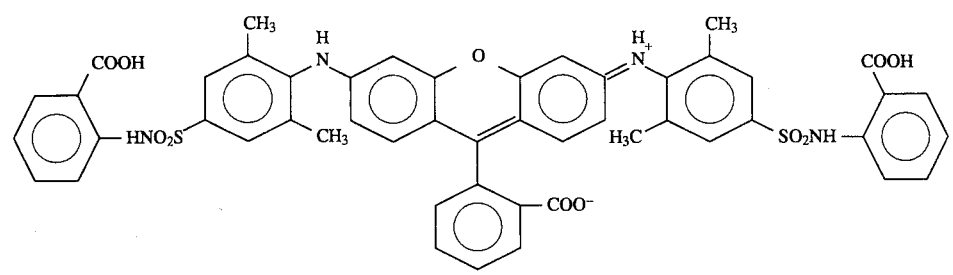 (I-10)
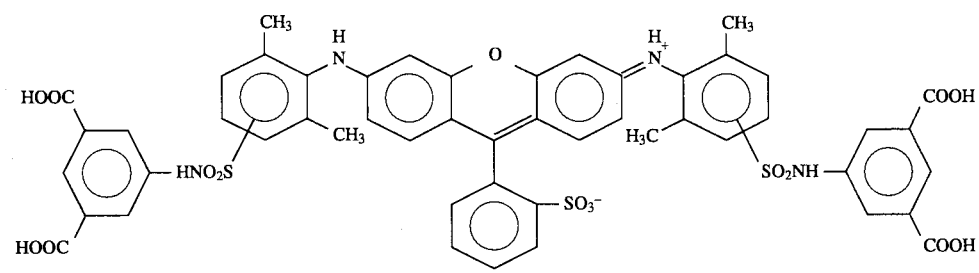 (I-11)
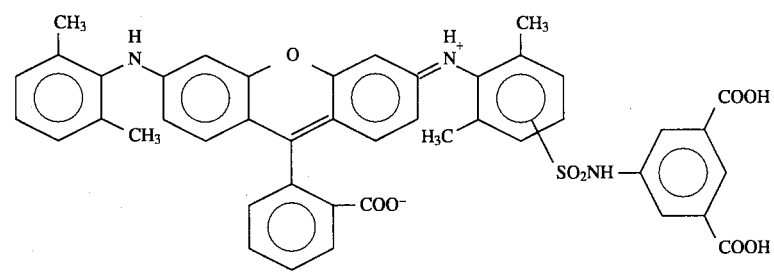 (I-12)

Particular embodiments of a surfactant of the general formula (IV) or (V) according to the present invention is described in the form of free acids.

$$CH_3(CH_2)_{12}O(CH_2CH_2O)_3CH_2COOH \qquad (IV-1)$$
$$CH_3(CH_2)_{12}O(CH_2CH_2O)_4CH_2COOH \qquad (IV-2)$$
$$CH_3(CH_2)_{12}O(CH_2CH_2O)_5CH_2COOH \qquad (IV-3)$$
$$CH_3(CH_2)_{12}O(CH_2CH_2O)_6CH_2COOH \qquad (IV-4)$$

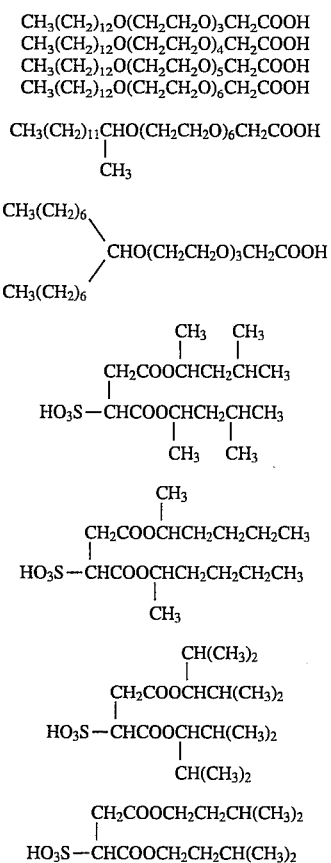

A water-soluble dye and a surfactant according to the present invention have a counter ion selected from a lithium ion, a sodium ion, a quaternary ammonium ion, a quaternary phosphonium ion and an alkanol amine ion, so that a stable solubility of the water-soluble dye and the surfactant can be achieved during the preservation and a reliable property of them can be improved when an ink is spurted by applying a thermal energy to the ink. For example, an addition of lithium hydroxide can produce a lithium salt. A cation of compounds of the above-mentioned general formula (III) may be also prepared by adding the following hydroxides.

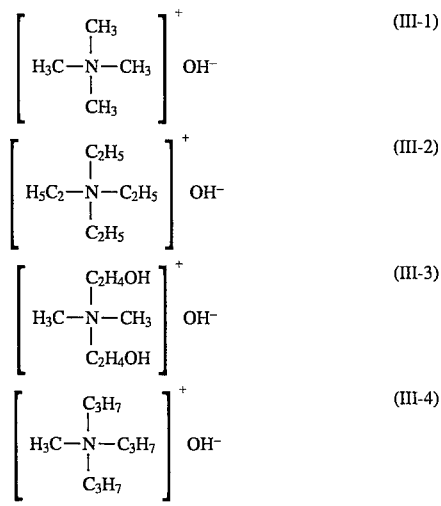

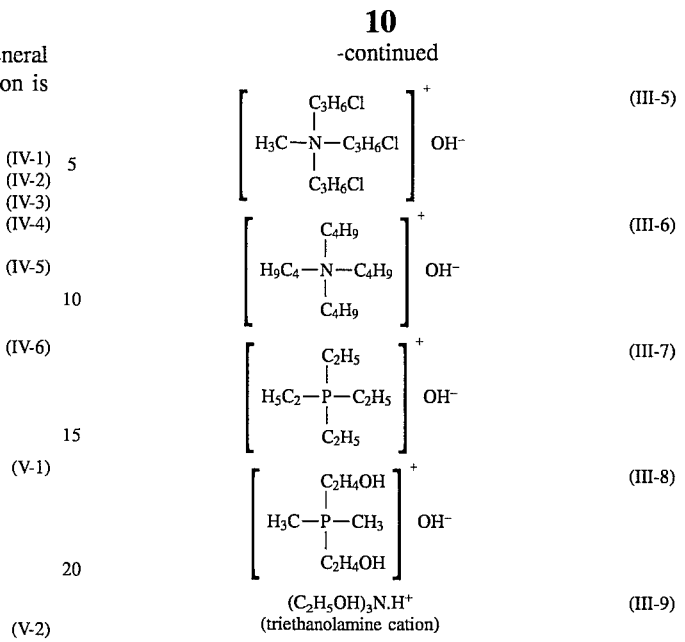

$$(C_2H_5OH)_3N.H^+ \qquad (III-9)$$
(triethanolamine cation)

According to the above-mentioned embodiment of the present invention, all of the counter ions of the dyes and the surfactants should not be limited to the above-mentioned cation ion selected from sodium, lithium and/or the compounds of the general formula (III), and other alkali ions may be added. An amount of the ions of sodium, lithium, the compounds of the general formula (III) is preferably equal to or more than 30% by mole fractions for the dyes and for the surfactants, more preferably equal to or more than 50%.

While water is used as a liquid medium according to one embodiment of the inventive ink, another water-soluble organic solvent can be selected from the following solvents which can be used in order to achieve the desired physical property of the ink, prevent the ink being dried, and improve the stable solubility of the compositions of the present invention.

The water-soluble organic solvent is selected from a class of polyhydric alcohol such as ethylene glycol, diethylene glycol, triethylene glycol, polyethylene glycol, polypropylene glycol, 1,5-pentanediol, 1,6-hexanediol, glycerol, 1,2, 6-hexanetriol, 1,2,4-butanetriol, 1,2,3-butanetriol and 3 methylpentane-1,3,6-triol; a class of polyhydric alcohol alkyl ether such as ethylene glycol monoethyl ether, ethylene glycol monobutyl ether, diethylene glycol monomethyl ether and diethylene glycol monoethyl ether; a class of polyhydric alcohol aryl ether such as ethylene glycol monophenyl ether and ethylene glycol monobenzyl ether; a nitrogen heterocycle compound such as N-methyl-2-pyrrolidone, N-hydroxyethyl-2-pyrrolidone, 1,3-dimethylimidazolidinone, ε-caprolactam and γ-butyrolactone; a class of amide such as formamide, N-methylformamide and N,N-dimethylformamide; a class of amine such as monoethanolamine, diethanolamine, triethanolamine, monoethylamine, diethylamine and triethylamine; a sulfur compound such as dimethyl sulfoxide, sulfolane and thiodiethanol; propylene carbonate; ethylene carbonate; and so on. One solvent alone or a compound of several solvents are selected from the above-mentioned possible solvents and used with water to dissolve the composition of the ink.

The most preferable solvents of the above-mentioned solvents are diethylene glycol, thiodiethanol, polyethylene glycol (200–600), triethylene glycol, glycerol, 1,2,6-hexanetriol, 1,2,4-butanetriol, 3 methylpentane-1,3,5-triol, 1,5-pentanediol, N-methyl-2-pyrrolidone, N-hydroxyethyl-2- pyrrolidone. These preferable solvents can result in a high solubility of the composition of the present invention and an advantageous effect for preventing a degradation of a spurting of the ink due to an evaporation of water.

Besides the surfactants of the general formula (IV) and (V) according to the present invention, another osmotic agents is added to regulate a surface tension of the ink. This osmotic agent is selected from a class of polyhydric alcohol alkyl or aryl ether such as diethylene glycol monophenyl ether, ethylene glycol monophenyl ether, ethylene glycol monoallyl ether, diethylene glycol monobutyl ether, propylene glycol monobutyl ether and tetraethylene glycol chlorophenyl ether; a fluorine surfactant; and a lower alcohol such as ethanol and 2-propyl alcohol. In particular diethylene glycol monobutyl ether is preferable to be selected.

The surface tension of the ink according to the present invention indicates a permeability of the ink into the paper and particularly the dynamic surface tension measured a short period after a formation of the surface. Therefore, the above-mentioned surface tension is different from a static surface tension measured at a saturated time. The surface tension according to the present invention can be measured by a known method described in Japanese Laid-Open Patent Application No.63-31237, in which the dynamic surface tension is measured within a second after the formation of the surface. In the embodiment of the present invention a tension meter based on Wilhelmy plate method is used to measure the surface tension of the ink. A value of the surface tension is preferably equal to or less than 50 mN/m, and more preferably equal to or less than 40 mN/m, to obtain a superior dryness.

In addition to the dye of the general formula (I) and (II), various other colorants may be mixed with the dye to obtain the colorant of the ink according to the present invention. Water-soluble dyes, which have superior properties of waterfastness and lightfastness, are selected from Color Index classes such as an acid dye, a direct dye, a basic dye, a reactive dye or a food dye. An amount of these dyes to be added is limited within a range to the extent not to defeat an effect of the above-mentioned properties. Particular embodiments of the dyes are described as follows:

Acid Dye Class

C.I.(Color Index) ACID YELLOW 17, 23, 42, 44, 79,142 C.I. ACID RED 1, 8, 13, 14, 18, 26, 27, 35, 37, 42, 52, 82, 87, 89, 92, 97, 106, 111, 114, 115, 134, 186, 249, 254, 289

C.I. ACID BLUE 9, 29, 45, 92,249 C.I. ACID BLACK 1, 2, 7, 24, 26, 94

Food Dye Class

C.I. FOOD YELLOW 3, 4 C.I. FOOD RED 7, 9, 14 C.I. FOOD BLACK 1, 2

Direct Dye Class

DIRECT YELLOW 1, 12, 24, 26, 33, 44, 50, 86, 120, 132, 142, 144 C.I. DIRECT RED 1, 4, 9, 13, 17, 20, 28, 31, 39, 80, 81, 83, 89, 225, 227 C.I. DIRECT ORANGE 26, 29, 62, 102 C.I. DIRECT BLUE 1, 2, 6, 15, 22, 25, 71, 76, 79, 86, 87, 90, 98, 163, 165, 199, 202 C.I. DIRECT BLACK 19, 22, 32, 38, 51, 56, 71, 74, 75, 77, 154, 168, 171

Basic Dye Class

C.I. BASIC YELLOW 1, 2, 11, 13, 14, 15, 19, 21, 23, 24, 25, 28, 29, 32, 36, 40, 41, 45, 49, 51, 53, 63, 64, 65, 67, 70, 73, 77, 87, 91 C.I. BASIC RED 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112 C.I. BASIC BLUE 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155 C.I. BASIC BLACK 2, 8

Reactive Dye Class

C.I. REACTIVE BLACK 3, 4, 7, 11, 12, 17 C.I. REACTIVE YELLOW 1, 5, 11, 13, 14, 20, 21, 22, 25, 40, 47, 51, 55, 65, 67 C.I. REACTIVE RED 1, 14, 17, 25, 26, 32, 37, 44, 46, 55, 60, 66, 74, 79, 96, 97 C.I. REACTIVE BLUE 1, 2, 7, 14, 15, 23, 32, 35, 38, 41, 63, 80, 95

In particular, the dyes of the acid dye class and the direct dye class can be preferably used.

Various pigments also can be mixed with the ink according to the present invention. The pigments are selected from both an organic pigment class and an inorganic pigment class. The organic pigment is selected from an azo pigment, a phtalocyanine pigment, an anthraquinone pigment, a quinacridon pigment, a dioxazine pigment, an indigo pigment, a thioindigo pigment, a perylene pigment, an isoindolinone pigment, an aniline black, an azomethin pigment, a Rhodamine B lake pigment and carbon black. The inorganic pigment is selected from iron oxide, titanium oxide, calcium carbonate, barium sulfate, aluminium hydroxide, barium yellow, Prussian blue, cadmium red, chromium yellow and metal powder.

In the embodiment of the present invention, a dispersing agent for the pigment is a hydrophilic polymer which is selected from a natural polymer, a semisynthetic polymer and pure synthetic polymer. The natural polymer is selected from a plant polymer such as Arabian gum, tragacanth gum, guar gum, karaya gum, locust bean gum, arabinogalactan, pectin and quince seed starch; a seaweed polymer such as alginic acid, carrageenen and agar; and an animal polymer such as gelatin, casein, albumin and collagen; and a microbial polymer such as xanthene gum and dextran. The semisynthetic polymer is selected from a cellulose polymer such as methyl cellulose, ethyl cellulose, hydroxy ethyl cellulose, hydroxy propyl cellulose and carboxymethyl celllulose; a starch polymer such as starch sodium glycolic acid and starch sodium phosphoric ester; and a seaweed polymer such as sodium alginate and propylene glycol ester alginate. The pure synthetic polymer is selected from a vinyl polymer such as poly(vinyl alcohol ), poly(vinyl pyrrolidone) and poly(vinyl methyl ether); acryl resin such as non-bridge polyacrylamide, polyacrylate and alkali metals salt thereof, and water-soluble styrene maleic acrylic resin; water-soluble styrene maleate resin; water-soluble vinylnaphthalene acryl resin; water-soluble vinylnaphthalene maleic resin; poly(vinyl pyrrolidone); poly(vinyl alcohol); and a polymer compound having at a side chain a cationic function group salt such as an alkali metal salt of β-naphthalenesulfonic acid formalin condensation product, quaternary ammonium and an amino group. A natural polymer compound, for example, shellac may be used for the dispersing agent for the pigment.

Some known additives other than the above-mentioned colorants and solvents can be added to the ink according to the present invention.

In the embodiment of the present invention, for example, biocide is selected from sodium dehydroacetate, sodium sorbate, 2-pyridine thiol-1-sodium oxide, sodium benzoate and sodium pentachlorophenol.

Any substances can be used as a moderator for the pH if the substance can adjust the pH of the ink to be equal to or more than 7 while preventing the ink to be prepared being damaged.

For example, the substances may be selected from an amine such as diethanol amine and triethanol amine; a hydroxide of an alkali metals element such as lithium hydroxide, sodium hydroxide and potassium hydroxide; and a carbonic salt of alkali metals such as ammonium hydroxide, quaternary ammonium hydroxide, quaternary phosphonium hydroxide, lithium carbonate, sodium carbonate and potassium carbonate.

A chelate reagent, for example, may be selected from sodium ethylenediaminetetraacetate, sodium nitrilotriacetate, sodium hydroxyethyl ethylenediaminetriacetate, sodium diethylenetriaminepentaacetate and sodium uramildiacetate.

A rust preventive, for example, may be selected from acid sulfite, sodium thiosulfate, thiodiglycolic acid ammonium salt, diisopropyl ammonium nitrate, pentaerythritol tetranitrate and dicyclohexylammoium nitrate.

In addition to the above-mentioned substances, some water-soluble ultraviolet absorption agents, water-soluble infrared absorption agents or surfactants can be added to the ink according to different purposes.

The following non-limiting examples and control experiments illustrate the present invention.

Example 1

An ink 1 was made of a composition formulated as follows, in which the composition was stirred and dissolved at 600° C., and then was cooled down at room temperature. Next the cooled composition was adjusted with a solution of 10% lithium hydroxide in order to obtain a pH of 8.5. The ink 1 was separated from the solution with a 0.22 μm teflon filter.

| Composition | |
|---|---|
| Dye of the formula (I-1) | 1.5% by weight |
| Glycerol | 5% by weight |
| N-hydroxyethyl pyrrolidone | 5% by weight |
| Surfactant of the formula (IV-1) | 0.8% by weight |
| Sodium dehydroacetate | 0.2% by weight |
| Ion-exchanged water | remainder |

Example 2

An ink 2 was made of a composition formulated as follows, in which the composition was stirred and dissolved at 60° C., and then was cooled down to room temperature. Next the cooled composition was adjusted with a solution of 10% sodium hydroxide in order to obtain pH of 8.8. The ink 2 was separated from the solution with a 0.22 μm teflon filter.

| Composition | |
|---|---|
| Dye of the formula (I-2) | 1.5% by weight |
| DIRECT RED 227 | 0.5% by weight |
| 1,2,6-hexantriol | 4% by weight |
| 1,5-pentandiol | 8% by weight |
| Surfactant of the formula (V-1) | 1.2% by weight |
| Solution of 25% of the formula (III-1) | 0.8% by weight |
| 2-pyridine thiol-sodium oxide | 0.2% by weight |
| Ion-exchanged water | remainder |

Example 3

An ink 3 was made of a composition formulated as follows, in which the composition was stirred and dissolved at 60° C., and then was cooled down to room temperature. Next the cooled composition was adjusted with a solution of 10% sodium hydroxide in order to obtain pH of 8.5. The ink 3 was separated from the solution with a 0.22 μm teflon filter.

| Composition | |
|---|---|
| Dye of the formula (I-4) | 1% by weight |
| DIRECT BLUE 199 | 1.2% by weight |
| Diethylene glycol | 5% by weight |
| Glycerol | 5% by weight |
| Surfactant of the formula (IV-4) | 2% by weight |
| Solution of 25% of the formula (III-3) | 0.2% by weight |
| Sodium dehydroacetate | 0.2% by weight |
| Ion-exchanged water | remainder |

Example 4

An ink 4 was made of a composition formulated as follows, in which the composition was stirred and dissolved at 60° C., and then was cooled down to room temperature. Next the cooled composition was adjusted with a solution of 10% sodium hydroxide in order to obtain pH of 7.5. The ink 4 was separated from the solution with a 0.22 μm teflon filter.

| Composition | |
|---|---|
| Dye of the formula (I-5) | 1.2% by weight |
| Ethylene glycol | 5% by weight |
| Glycerol | 2% by weight |
| 1,5-pentanediol | 10% by weight |
| Surfactant of the formula (V-2) | 0.8% by weight |
| Sodium benzoate | 0.2% by weight |
| Ion-exchanged water | remainder |

Example 5

An ink 5 was made of a composition formulated as follows, in which the composition was stirred and dissolved at 60° C., and then was cooled down to room temperature. Next the cooled composition was adjusted with a solution of 10% sodium hydroxide in order to obtain pH of 7.8. The ink 5 was separated from the solution with a 0.22 μm teflon filter.

| Composition | |
|---|---|
| Dye of the formula (I-2) | 1.2% by weight |
| Dye of the formula (I-8) | 0.5% by weight |
| Triethylene glycol | 5% by weight |
| Petriol | 10% by weight |
| Surfactant of the formula (IV-5) | 2% by weight |
| Solution of 25% of the formula (III-2) | 1.5% by weight |
| Ion-exchanged water | remainder |

Example 6

An ink 6 was made of a composition formulated as follows, in which the composition was stirred and dissolved at 60° C., and then was cooled down to room temperature. Next the cooled composition was adjusted with a solution of 10% lithium hydroxide in order to obtain pH of 8. The ink 6 was separated from the solution with a 0.22 μm teflon filter.

| Composition | |
|---|---|
| Dye of the formula (I-9) | 1.5% by weight |
| DIRECT RED 227 | 1.5% by weight |
| Propylene glycol | 8% by weight |
| Glycerol | 7% by weight |
| Surfactant of the formula (IV-6) | 1% by weight |
| Solution of 25% of the formula (III-7) | 2% by weight |
| Ion-exchanged water | remainder |

Example 7

An ink 7 was made of a composition formulated as follows, in which the composition was stirred and dissolved at 60° C., and then was cooled down to room temperature. Next the cooled composition was adjusted with a solution of 10% lithium hydroxide in order to obtain pH of 8. The ink 7 was separated from the solution with a 0.22 μm teflon filter.

| Composition | |
|---|---|
| Dye of the formula (III-4) | 1.8% by weight |
| N-methyl-2-pyrrolidone | 8% by weight |
| 1,5-pentandiol | 8% by weight |
| Surfactant of the formula (V-4) | 0.8% by weight |
| Sodium benzoate | 0.1% by weight |
| Ion-exchanged water | remainder |

Example 8

An ink 8 was made of a composition formulated as follows, in which the composition was stirred and dissolved at 60° C., and then was cooled down to room temperature. Next the cooled composition was adjusted with a solution of 10% sodium hydroxide in order to obtain pH of 7.5. The ink 8 was separated from the solution with a 0.22 μm teflon filter.

| Composition | |
|---|---|
| Dye of the formula (I-2) | 2.0% by weight |
| Dye of the formula (I-12) | 0.5% by weight |
| Thiodiethanol | 5% by weight |
| Glycerol | 10% by weight |
| Surfactant of the formula (IV-4) | 1.5% by weight |
| Sodium benzoate | 0.1% by weight |
| Ion-exchanged water | remainder |

Example 9

The example 9 was similar to the above-mentioned example 1, except that the surfactant of the formula (IV-1) was replaced with a compound of the general formula (1), where m+n=10, and thus an ink 16 was prepared.

Example 10

The example 10 was similar to the above-mentioned example 8, except that the surfactant of the formula (IV-1) was replaced with a mixture of a 1% compound of the general formula (1), where m+n=30, with a 0.5% compound of the general formula (2), and thus an ink 17 was prepared.

Example 11

The example 11 was similar to the above-mentioned example 8, except that the surfactant of the formula (IV-1) was replaced with a mixture of a 1% compound of the general formula (1), where m+n=30, with a 0.5% compound of the general formula (3), and thus an ink 18 was prepared.

Control 1

The control 1 was similar to the above-mentioned example 1, except that the dye of the formula (I-1) was replaced with ACID RED 35, and thus an ink 9 was prepared.

Control 2

The control 2 was similar to the above-mentioned example 2, except that the dye of the formula (I-2) was replaced with DIRECT RED 227, and thus an ink 10 was prepared.

Control 3

The control 3 was similar to the above-mentioned example 3, except that the dye of the formula (I-4) was replaced with DIRECT RED 9, and thus an ink 11 was prepared.

Control 4

The control 4 was similar to the above-mentioned example 4, except that the dye of the formula (I-5) was replaced with PIGMENT RED 122, and thus an ink 12 was prepared.

Control 5

The control 5 was similar to the above-mentioned example 4, except that the dye of the formula (I-5) was replaced with ACID RED 289, and thus an ink 13 was prepared.

Control 6

The control 6 was similar to the above-mentioned example 6, except that the solution of 25% of the formula (III-7) was removed and the pH was adjusted to 8 with potassium hydroxide, and thus an ink 14 was prepared.

Control 7

The control 7 was similar to the above-mentioned example 1, except that the dye of the formula (I-1) was replaced with a dye of the following formula and lithium hydroxide was replaced with ammonium hydroxide, and thus an ink 15 was prepared.

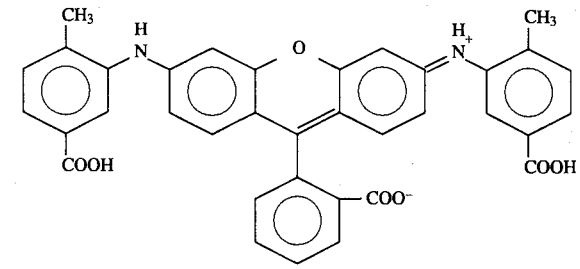

For the above-mentioned examples from 1 to 7 and the controls from 1 to 7, the following tests were executed. Results of the tests are shown in Table 1 hereinafter.

(1) SHARPNESS OF IMAGE

Two ink-jet printers were used to print an image on paper so as to totally determine qualities of the ink such as a spread over a zone on which two colors were superimposed, a spread over the paper, a tone and a density by visual inspection. One of the printers was a thermal ink-jet printer having a 300 dpi type of nozzle, and the other was an ink-jet printer having a 300 dpi type of nozzle employing multi-layered PZT to press against a passage of a liquid chamber.

The image was printed on three kinds of commercially available sheets including reproduction paper, woodfree paper and bond paper.

The result of the sharpness of the image was expressed by o, Δ or X in the Table 1, where o, Δ and X represent high, middle and low sharpness of the image, respectively.

(2) WATERFASTNESS OF IMAGE

Samples of the image were soaked in water at 300° C. for a minute and a variation of the image density was measured before and after soaking by a Macbeth densitometer, and then waterfastness (fading rate) of the image was calculated by the following formulation.

$$\text{FADING RATE (\%)} = \left[ 1 - \frac{I.D.\text{ before soaking}}{I.D.\text{ after soaking}} \right] \times 100$$

where the I.D. represents the image density.

The result of the test was expressed by o or X, where o represents the fading rate less than 20%, X represents the fading rate beyond 30%, respectively. Δ, if any, represents the fading rate from 20% to 30%.

(3) DRYNESS OF IMAGE

After the image was printed on the paper, a filter paper was applied to the ink printed on the three types of paper under a given condition so as to measure an interval time until the ink would not have been transferred to the filter paper.

The result of the test was expressed by o or X, where o represents the interval time faster than 10 seconds for any type of the above-mentioned paper and otherwise was written in the Table 1.

(4) SURFACE TENSION OF INK

Surface tension of the ink was measured.

(5) PRESERVATION STABILITY OF INK

The ink to be tested was contained in a container of polyethylene and had been preserved for 3 months at the temperature of −20° C., 50° C., 20° C. and 70° C., respectively. After the preservation, surface tension, viscosity and an existence of a precipitation were inspected. The result of the test was expressed by o or X, where o represents that the physical property of the ink had not changed under any temperature condition and X represents that some changes were found in the physical property of the ink at least under one of the temperature conditions.

(6) RELIABILITY OF INK ON RESTART OF PRINTING

A possible interval time, during which the printer could have been stopped and after which the printer could be restarted with no requirements for capping or cleaning of a head of the printer during printer operation, was measured. More particularly, the reliability of the ink after being stopped was estimated by the possible stopped time for which an offset of an ink-jet direction has not occurred and a weight of a spurted droplet of the ink has not changed. The result was represented by the interval time measured in the above-mentioned way.

TABLE 1

|        | I   | II  | III | IV | V    | VI      |
|--------|-----|-----|-----|----|------|---------|
| ex. 1  | O   | O   | O   | 30 | O    | 600 (c) |
| ex. 2  | O   | O   | O   | 30 | O    | 600 (c) |
| ex. 3  | O   | O   | O   | 32 | O    | 550     |
| ex. 4  | O   | O   | O   | 30 | O    | 500     |
| ex. 5  | O   | O   | O   | 30 | O    | 580     |
| ex. 6  | O   | O   | O   | 29 | O    | 510     |
| ex. 7  | O   | O   | O   | 29 | O    | 505     |
| ex. 8  | O   | O   | O   | 30 | O    | 500     |
| ex. 9  | O   | O   | O   | 32 | O    | 600 (c) |
| ex. 10 | O   | O   | O   | 34 | O    | 600 (c) |
| ex. 11 | O   | O   | O   | 33 | O    | 560     |
| co. 1  | O   | X   | O   | 30 | O    | 600 (c) |
| co. 2  | Δ (a) | O | O   | 30 | X (b) | 400    |
| co. 3  | Δ (a) | O | O   | 32 | X (b) | 500    |
| co. 4  | X   | O   | O   | 29 | X    | 250     |
| co. 5  | O   | X   | O   | 30 | O    | 600 (c) |
| co. 6  | O   | O   | O   | 30 | X    | 500     |
| co. 7  | O   | O   | O   | 30 | X    | 550     |

I represents sharpness of the image.
II represents waterfastness of the image.
III represents dryness of the image.
IV represents surface tension (mN/m at 1 sec) of the ink.
V represents preservation stability of the ink.
VI represents ink-jet reliability (sec).
Ex. 1 to ex. 11 represent the above-mentioned examples from 1 to 11 and co. 1 to co. 7 represent the above-mentioned controls from 1 to 7, respectively.
(a) represents that the tone was not clear, (b) represents that the preservation was not stable at −20° C. and 5° C. and (c) represents the interval time was equal to or more than 600 seconds.

An inventive ink of the present invention advantageously includes the particular dyes, which have not been known in the art, so that a high chroma and high hue image can be recorded on plain paper and a superior waterfastness of the ink can be achieved. The ink also includes the surfactants to reduce the surface tension of the ink lower than 50 mN/m, so that wetness for the surface of the paper can be improved. Furthermore, with the particular water-soluble dyes, the aqueous ink composition which satisfies desired properties of the ink-jet can be provided, so that the superior dryness of the image can be achieved and the degradation of the image quality can be suppressed.

According to the present invention a reliable aqueous ink composition for the ink-jet printer which has a stability, for example, a preservation stability and a drop ejection stability, can be provided by specifying a counter ion of the above-mentioned inventive dyes.

Further, according to the present invention, an ink composition, which has a superior dryness and has less spread over the paper, can be provided by specifying a structure of the above-mentioned surfactants, and the preservation stability and the spurt stability can be obtained by specifying a counter ion of the surfactants.

According to the present invention, a recording composition for the ink-jet, which offers a suitable property to be spurted stably even after a long interval from a previous printing or after a continuous ink-jet printing, can be advantageously provided by adjusting the pH of the ink to be equal to or more than 6.

According to the present invention, an image can be advantageously recorded on both plain paper and coated paper, in which the image has a superior wetness, a rapid penetrating into the paper and less spread over the paper. Thus, a method for recording a color image having a high color regeneration property can be advantageously obtained. Therefore, the superior color regeneration property can be achieved in use of an overhead projector.

Further, the present invention is not limited to the above-described embodiments, and variations and modifications may be made without departing from the scope of the present invention.

What is claimed is:

1. An aqueous ink composition comprising a dye, water and a huemectant, wherein said dye comprises a dye of the general formula (I):

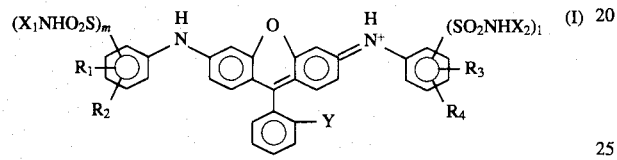

wherein each of $R_1$, $R_2$, $R_3$ and $R_4$ are selected from the group consisting of a hydrogen atom, an alkyl group having from 1 to 4 carbon atoms and a halogen atom; and $X_1$ and $X_2$ are selected from the group consisting of the general formula (IIa) and (IIb):

$$-(CH_2)_a COOM \qquad (IIa)$$

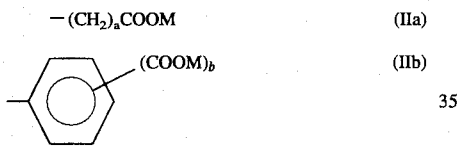

wherein M is selected from the group consisting of an alkali metal, quaternary ammonium, quaternary phosphonium and alkanol amine having from 1 to 4 carbon atoms; a is an integer varying from 0 to 6, b is an integer varying from 1 to 2; 1 and m are integers having a value of 0 or 1 while 1 and m are not simultaneously equal to 1; and Y is selected from the group consisting of $-SO_3^-$ and $-COO^-$.

2. The aqueous ink composition as claimed in claim 1, wherein said dye of the general formula (I) has a cation type of a counter ion selected from the group consisting of Na, Li and compounds of the general formula (III):

wherein Z is selected from the group consisting of a nitrogen atom and a phosphorous atom; $R_5$, $R_6$, $R_7$ and $R_8$ are selected from the group consisting of a hydrogen atom, an alkyl group having from 1 to 4 carbon atoms, a hydroxy alkyl group having from 1 to 4 carbon atoms and a halide alkyl group having from 1 to 4 carbon atoms.

3. The aqueous ink composition as claimed in claim 1, wherein the surface tension of said aqueous ink composition is equal to or less than 50 mN/m and which additionally contains as a surfactant polyoxyethylenealkyl etheracetic acid salt of the general formula (IV) and/or dialkyl sulfosuccinic acid salt of the general formula (V)

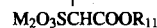

wherein $R_9$ is selected from the group consisting of a straight chain and branching alkyl group having from 6 to 14 carbon atoms; $R_{10}$ and $R_{11}$ are selected from the group consisting of a branching alkyl group having from 5 to 7 carbon atoms; $M_1$ and $M_2$ are selected from the group consisting of an alkali metal, quaternary ammonium, quaternary phosphonium and alkanol amine having from 1 to 4 carbon atoms; and n is an integer varying from 3 to 12.

4. The aqueous ink composition as claimed in claim 1, wherein the surface tension of said aqueous ink composition is equal to or less than 50 mN/m and which additionally contains as a surfactant at least one compound selected from the group consisting of compounds of the following general formulas (VI), (VII) and (VIII):

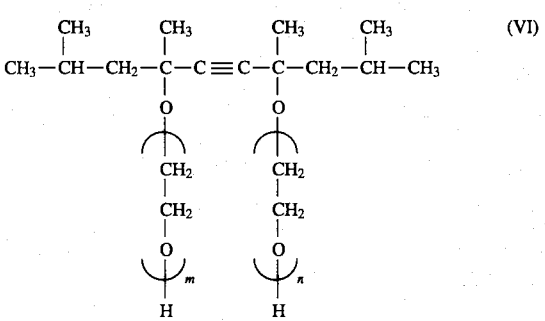

where m and n represent integers satisfying $3<m+n<40$;

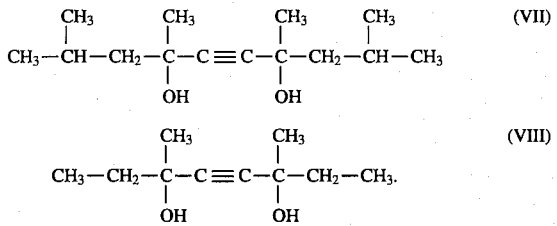

5. The aqueous ink composition as claimed in claim 1, wherein the pH of said aqueous ink composition is adjusted to be equal to or more than 6 by adding a hydroxide compound selected from the group consisting of sodium hydroxide; lithium hydroxide; and a hydroxide of a compound of general formula (III):

wherein Z is selected from the group consisting of a nitrogen atom and a phosphorous atom; $R_5$, $R_6$, $R_7$ and $R_8$ are selected from the group consisting of a hydrogen atom, an alkyl group having from 1 to 4 carbon atoms, a hydroxy alkyl group having from 1 to 4 carbon atoms and a halide alkyl group having from 1 to 4 carbon atoms.

6. A method for recording an image comprising the steps of:

ejecting a small droplet of an ink composition by applying a thermal energy or mechanical energy to the ink composition; and adhering said droplet to an agent to which the image is to be recorded, wherein said agent has a Stockigt sizing degree of equal to or more than 3 seconds, and wherein said ink composition comprises a dye, water and a huemectant, said dye comprising a dye of a general formula (I):

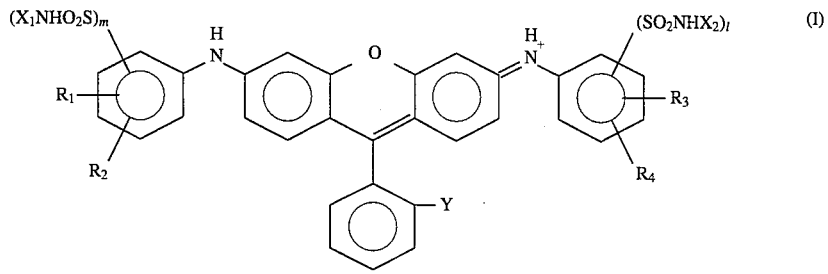

wherein each of $R_1$, $R_2$, $R_3$ and $R_4$ are selected from the group consisting of a hydrogen atom, an alkyl group having from 1 to 4 carbon atoms and a halogen atom; $X_1$ and $X_2$ are selected from the group consisting of the general formula (IIa) and (IIb):

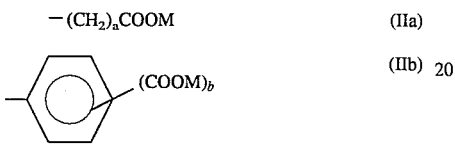

wherein M is selected from the group consisting of an alkali metal, quaternary ammonium, quaternary phosphonium and alkanol amine having from 1 to 4 carbon atoms; a is an integer varying from 0 to 6 and b is an integer varying from 1 to 2; l and m are integers having a value of 0 or 1 while l and m are not simultaneously equal to 1; and Y is selected from the group consisting of $—SO_3^-$ and $—COO^-$.

7. The method for recording an image as claimed in claim 6, wherein said dye of the general formula (I) has a cation type of a counter ion selected from the group consisting of Na, Li and compounds of a general formula (III):

wherein Z is selected from the group consisting of a nitrogen atom and a phosphorous atom; $R_5$, $R_6$, $R_7$ and $R_8$ are selected from the group consisting of a hydrogen atom, an alkyl group having from 1 to 4 carbon atoms, a hydroxy alkyl group having from 1 to 4 carbon atoms and a halide alkyl group having from 1 to 4 carbon atoms.

8. The method for forming and recording an image as claimed in claim 6, wherein the surface tension of the aqueous ink composition is equal to or less than 50 mN/m and which additionally contains as a surfactant polyoxyethylenealkyl etheracetic acid salt of the general formula (IV) and/or dialkyl sulfosuccinic acid salt of the general formula (V):

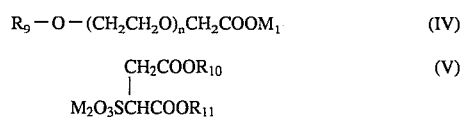

wherein $R_9$ is selected from the group consisting of a straight chain and branching alkyl group having from 6 to 14 carbon atoms; $R_{10}$ and $R_{11}$ are selected from the group consisting of a branching alkyl group having from 5 to 7 carbon atoms; $M_1$ and $M_2$ are selected from the group consisting of an alkali metal, quaternary ammonium, quaternary phosphonium and alkanol amine having from 1 to 4 carbon atoms; and n is an integer varying from 3 to 12.

9. The method for recording an image as claimed in claim 6, wherein the pH of the aqueous ink composition is adjusted to be equal to or more than 6 by adding a hydroxide compound selected from the group consisting of sodium hydroxide, lithium hydroxide and a hydroxide of a compound of general formula (III):

$$\begin{array}{c} R_5 \\ | \\ R_8-Z-R_6 \\ | \\ R_7 \end{array} \quad (III)$$

wherein Z is selected from the group consisting of a nitrogen atom and a phosphorous atom; $R_5$, $R_6$, $R_7$ and $R_8$ are selected from the group consisting of a hydrogen atom, an alkyl group having from 1 to 4 carbon atoms, a hydroxy alkyl group having from 1 to 4 carbon atoms and a halide alkyl group having from 1 to 4 carbon atoms.

* * * * *